US012555881B2

(12) United States Patent
Huang

(10) Patent No.: US 12,555,881 B2
(45) Date of Patent: Feb. 17, 2026

(54) TRANSMISSION DEVICE WITH PHASE ADJUSTMENT FUNCTION

(71) Applicant: Wistron NeWeb Corp., Hsinchu (TW)

(72) Inventor: Chun-Lin Huang, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 216 days.

(21) Appl. No.: 18/448,436

(22) Filed: Aug. 11, 2023

(65) Prior Publication Data

US 2024/0088564 A1 Mar. 14, 2024

(30) Foreign Application Priority Data

Sep. 8, 2022 (TW) .................................. 111134038

(51) Int. Cl.
*H01P 1/18* (2006.01)

(52) U.S. Cl.
CPC ................ *H01P 1/184* (2013.01); *H01P 1/18* (2013.01)

(58) Field of Classification Search
CPC ........................................................ H01P 1/184
USPC .......................................................... 333/161
See application file for complete search history.

(56) References Cited

U.S. PATENT DOCUMENTS

| | | | | |
|---|---|---|---|---|
| 6,208,222 | B1 * | 3/2001 | Sinsky | H01P 1/184 333/156 |
| 6,683,582 | B1 * | 1/2004 | Love | H01P 1/183 333/160 |
| 11,990,660 | B2 * | 5/2024 | Lee | H01P 1/18 |
| 2011/0273244 | A1 * | 11/2011 | Iluz | H01P 1/184 333/161 |
| 2013/0076453 | A1 * | 3/2013 | Lai | H01P 1/184 333/125 |
| 2019/0221910 | A1 * | 7/2019 | Harel | H01P 1/184 |

FOREIGN PATENT DOCUMENTS

CN 202940807 U 5/2013

OTHER PUBLICATIONS

IEEE 100, The Authoritative Dictionary of IEEE Standards Terms, 7th Ed., 2000, pp. 246-247, 793-794. (Year: 2000).*

* cited by examiner

*Primary Examiner* — Andrea Lindgren Baltzell
*Assistant Examiner* — Victor Cole
(74) *Attorney, Agent, or Firm* — McClure, Qualey & Rodack, LLP

(57) ABSTRACT

A transmission device with a phase-adjustment function includes a first dielectric layer, a signal line, a ground plane, and a first metal element. The first dielectric layer has a first surface and a second surface which are opposite to each other. The signal line is disposed on the first surface of the first dielectric layer. The ground plane is disposed on the second surface of the first dielectric layer. The first metal element is coupled to a first connection point on the signal line. The first metal element is configured to provide a first delay phase.

15 Claims, 8 Drawing Sheets

TRANSMISSION DEVICE WITH PHASE ADJUSTMENT FUNCTION

CROSS REFERENCE TO RELATED APPLICATIONS

This application claims priority of Taiwan Patent Application No. 111134038 filed on Sep. 8, 2022, the entirety of which is incorporated by reference herein.

BACKGROUND OF THE INVENTION

Field of the Invention

The disclosure generally relates to a transmission device, and more particularly, to a transmission device with a phase-adjustment function.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna used for signal reception and transmission has a fixed phase, it will negatively affect the communication quality of the relative device. Accordingly, it has become a critical challenge for antenna designers to design a transmission device with a phase-adjustment function.

BRIEF SUMMARY OF THE INVENTION

In an exemplary embodiment, the invention is directed to a transmission device with a phase-adjustment function. The transmission device includes a first dielectric layer, a signal line, a ground plane, and a first metal element. The first dielectric layer has a first surface and a second surface which are opposite to each other. The signal line is disposed on the first surface of the first dielectric layer. The ground plane is disposed on the second surface of the first dielectric layer. The first metal element is coupled to a first connection point on the signal line. The first metal element is configured to provide a first delay phase.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
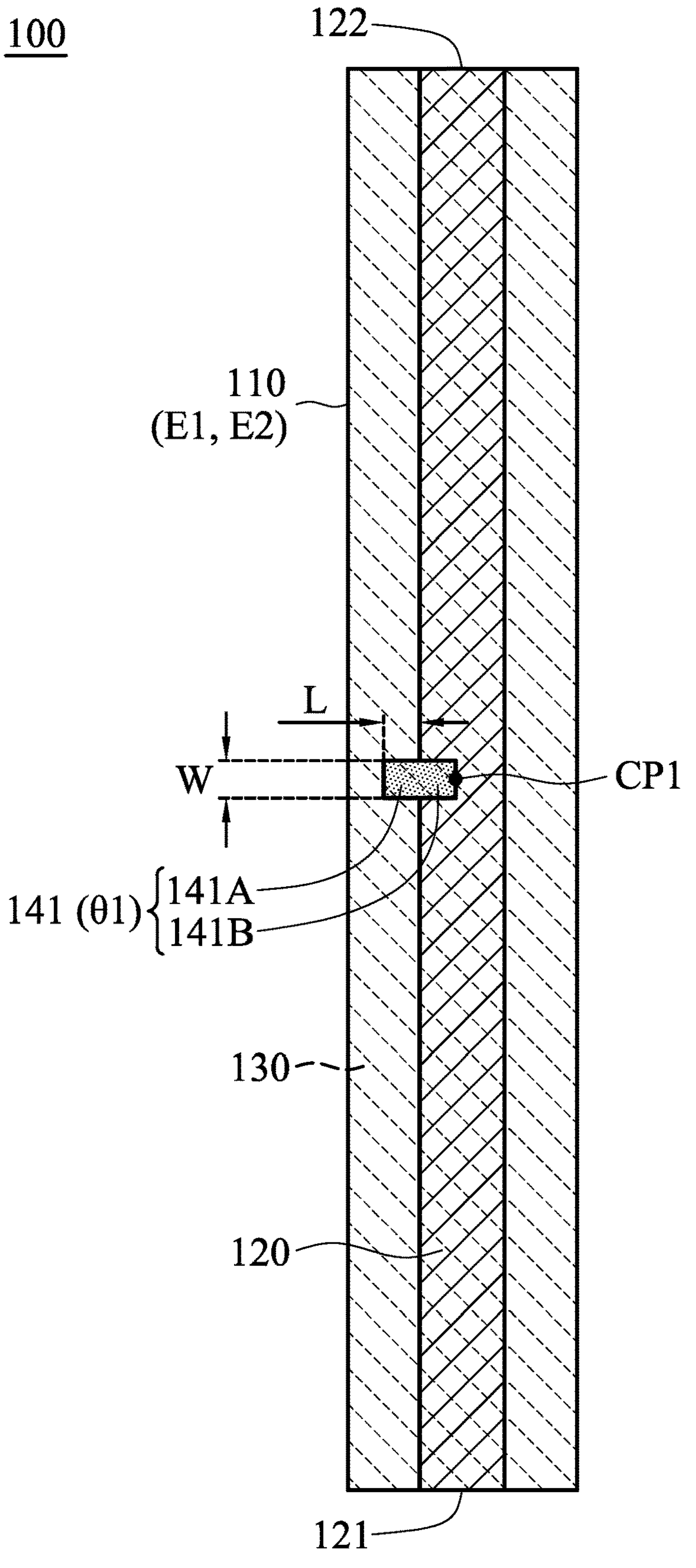
FIG. 1 is a top view of a transmission device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a top view of a transmission device 100 according to an embodiment of the invention. For example, the transmission device 100 may be applied to a wireless base station or a mobile device, but it is not limited thereto.

In the embodiment of FIG. 1, the transmission device 100 includes a first dielectric layer 110, a signal line 120, a ground plane 130, and at least one first metal element 141. The signal line 120, the ground plane 130, and the first metal element 141 may all be made of metal materials, such as copper, silver, aluminum, iron, or their alloys.

The first dielectric layer 110 may be an air layer, a foaming material layer, a plastic material layer, an FR4 (Flame Retardant 4) substrate, a PCB (Printed Circuit Board), or an FPC (Flexible Printed Circuit). The first dielectric layer 110 has a first surface E1 and a second surface E2 which are opposite to each other. The signal line 120 is disposed on the first surface E1 of the first dielectric layer 110. The ground plane 130 is disposed on the second surface E2 of the first dielectric layer 110. For example, if the first dielectric layer 110 is an air layer, the signal line 120 may be fixed by a nonconductive mechanism structure (not shown).

The signal line 120 may substantially have a straight-line shape. The ground plane 130 may be a metal plane. The signal line 120 is disposed opposite to the ground plane 130. A microstrip line is formed by the signal line 120 and the ground plane 130. Specifically, the signal line 120 has a first end 121 and a second end 122, which may be considered as an input terminal and an output terminal of the aforementioned microstrip line.

The first metal element 141 may substantially have a rectangular shape. The first metal element 141 is coupled to a first connection point CP1 on the signal line 120. The first metal element 141 is configured to provide a first delay phase θ1 for the aforementioned microstrip line. However, the invention is not limited thereto. In alternative embodiments, the first metal element 141 substantially has a triangular shape, an elliptical shape, or a wavy shape, without affecting its performance.

In some embodiments, the first metal element 141 has a protruding length L and a protruding width W with respect to the signal line 120. Specifically, the first metal element 141 includes a first portion 141A and a second portion 141B. The first portion 141A has a first vertical projection which does not overlap the signal line 120. The second portion 141B has a second vertical projection which overlaps the signal line 120. The protruding length L and the protruding width W mean the length and the width of the first portion 141A of the first metal element 141, respectively. For example, each of the protruding length L and the protruding width W may be from 1 mm to 3 mm.

According to practical measurements, the incorporation of the first metal element 141 gives the transmission device 100 a phase-adjustment function. Since the manufacturing cost of the first metal element 141 is relatively low and the whole circuitry of the transmission device 100 is relatively simple, such a design is suitable for application in a variety of electronic devices.

The following embodiments will introduce different configurations and detailed structural features of the transmission device 100. It should be understood that these figures and descriptions are merely exemplary, rather than limitations of the invention.

Figure 2:
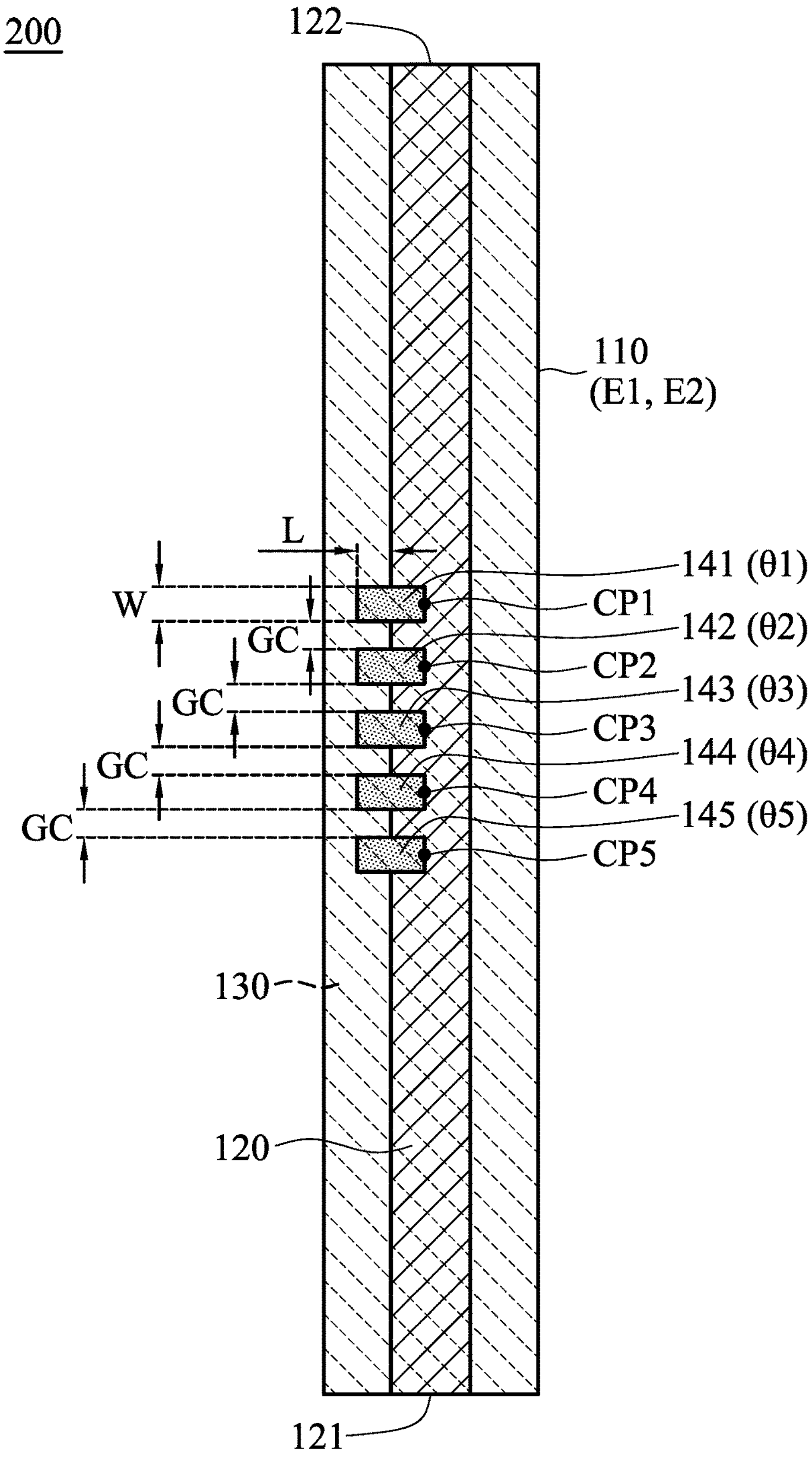
FIG. 2 is a top view of a transmission device according to an embodiment of the invention.

FIG. 2 is a top view of a transmission device 200 according to an embodiment of the invention. FIG. 2 is similar to FIG. 1. In the embodiment of FIG. 2, the transmission device 200 further includes a second metal element 142, a third metal element 143, a fourth metal element 144, and a fifth metal element 145. Each of the second metal element 142, the third metal element 143, the fourth metal element 144, and the fifth metal element 145 are made of a metal material, and it has the same structure as the aforementioned first metal element 141.

The second metal element 142 is disposed adjacent to the first metal element 141, and is coupled to a second connection point CP2 on the signal line 120. The second metal element 142 is configured to provide a second delay phase θ2 for the aforementioned microstrip line. It should be noted that the term "adjacent" or "close" over the disclosure means that the distance (spacing) between two corresponding elements is smaller than a predetermined distance (e.g., 10 mm or the shorter), but often does not mean that the two corresponding elements directly touch each other (i.e., the aforementioned distance/spacing between them is reduced to 0). In some embodiments, a coupling gap GC is formed between the second metal element 142 and the first metal element 141, and the width of the coupling gap GC is substantially equal to the protruding width W of the first metal element 141.

The third metal element 143 is disposed adjacent to the second metal element 142, and is coupled to a third connection point CP3 on the signal line 120. The third metal element 143 is configured to provide a third delay phase θ3 for the aforementioned microstrip line. The fourth metal element 144 is disposed adjacent to the third metal element 143, and is coupled to a fourth connection point CP4 on the signal line 120. The fourth metal element 144 is configured to provide a fourth delay phase θ4 for the aforementioned microstrip line. The fifth metal element 145 is disposed adjacent to the fourth metal element 144, and is coupled to a fifth connection point CP5 on the signal line 120. The fifth metal element 145 is configured to provide a fifth delay phase θ5 for the aforementioned microstrip line. In addition, the coupling gap GC may also be formed between any two adjacent metal elements (i.e., the second metal element 142, the third metal element 143, the fourth metal element 144, and the fifth metal element 145). It should be understood that the invention is not limited thereto. In alternative embodiments, the transmission device 200 include more or fewer metal elements according to different requirements.

In some embodiments, the total delay phase θ of the transmission device 200 is equal to the sum of the above delay phases ($\Sigma\theta_i$), and it is described using the following equation (1):

$$\theta = N \cdot P \cdot K \cdot \sqrt{1.15^{W} \cdot 2^{L} \cdot W \cdot L} \tag{1}$$

where "θ" represents the total delay phase θ, "N" represents the total number of metal elements, "P" represents a style constant equal to 1.18, "K" represents an error constant between 0.7 and 1.2, "W" represents the protruding width, and "L" represents the protruding length.

For example, "N" may be exactly to 1 in the embodiment of FIG. 1, and "N" may be exactly to 5 in the embodiment of FIG. 2. In addition, the unit of each of "W" and "L" is millimeter (mm). For example, if the protruding width W and the protruding length L are both equal to 1 mm, "W" and "L" may be both set to 1, but they are not limited thereto. In response, the unit of the total delay phase θ is "degree". Other features of the transmission device 200 of FIG. 2 are similar to those of the transmission device 100 of FIG. 1. Therefore, the two embodiments can achieve similar levels of performance.

Figure 3A:
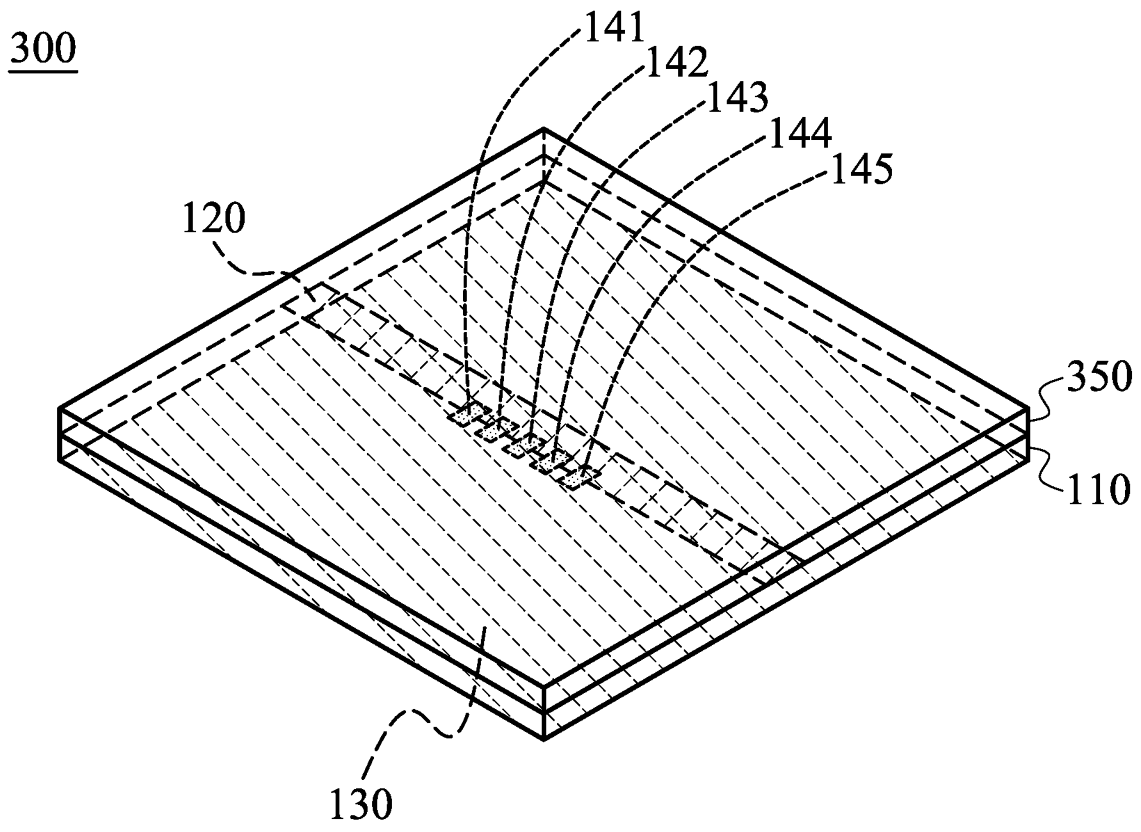
FIG. 3A is a perspective view of a transmission device according to an embodiment of the invention.
Figure 3B:
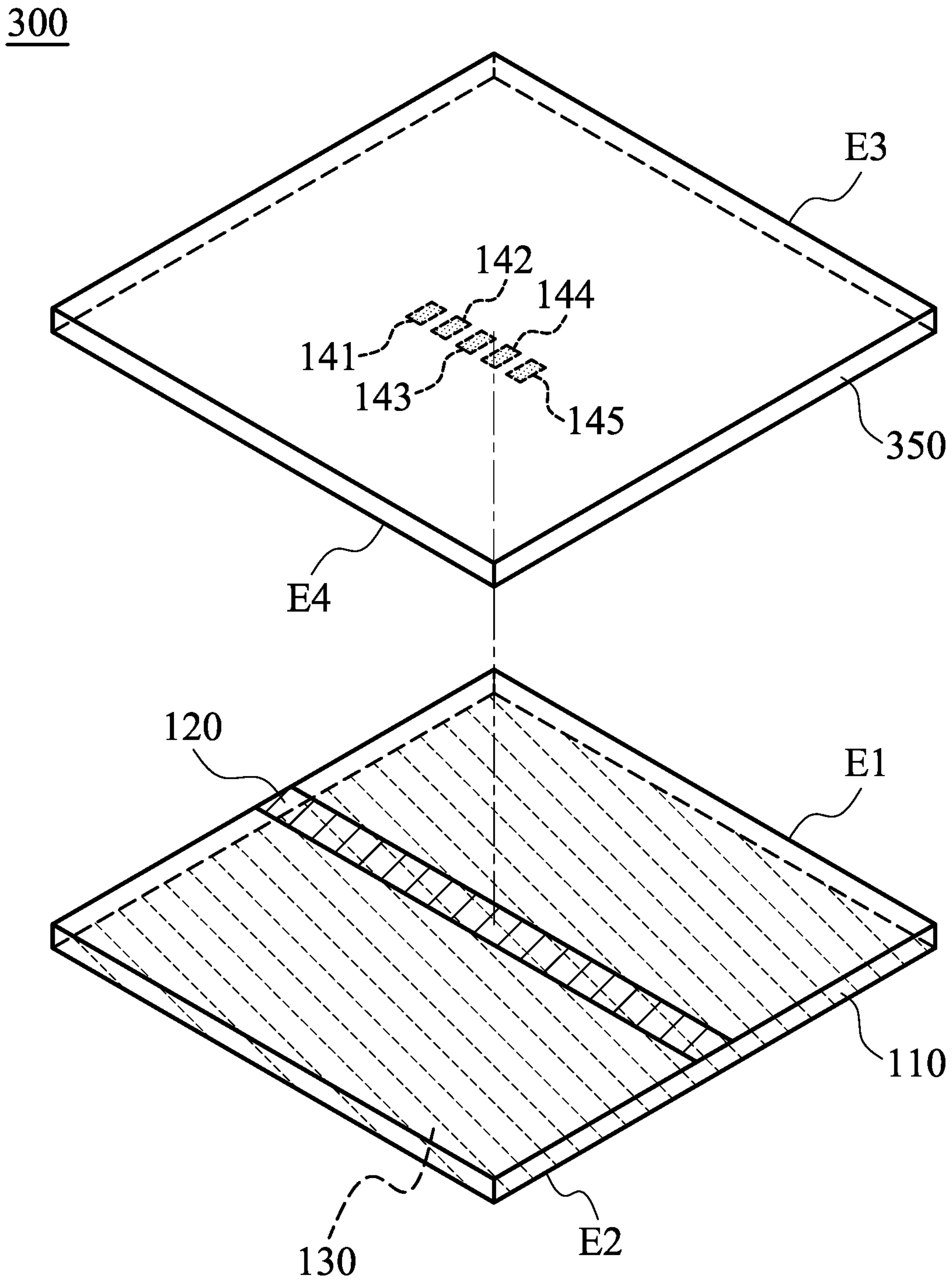
FIG. 3B is an exploded view of the transmission device according to an embodiment of the invention.

FIG. 3A is a perspective view of a transmission device 300 according to an embodiment of the invention. FIG. 3B is an exploded view of the transmission device 300 according to an embodiment of the invention. Please refer to FIG. 3A and FIG. 3B together. FIG. 3A and FIG. 3B are similar to FIG. 2. In the embodiment of FIG. 3A and FIG. 3B, the transmission device 300 further includes a second dielectric layer 350. For example, the second dielectric layer 350 may be an air layer, a foaming material layer, a plastic material layer, an FR4 substrate, a PCB, or an FPC. The second dielectric layer 350 has a third surface E3 and a fourth surface E4 which are opposite to each other. The first metal element 141, the second metal element 142, the third metal element 143, the fourth metal element 144, and the fifth metal element 145 may all be disposed on the fourth surface E4 of the second dielectric layer 350. Furthermore, the fourth surface E4 of the second dielectric layer 350 may be attached to the first surface E1 of the first dielectric layer 110. Thus, the first metal element 141, the second metal element 142, the third metal element 143, the fourth metal element 144, and the fifth metal element 145 are respectively coupled to different connection points on the signal line 120. For example, if the second dielectric layer 350 is an air layer, the first metal element 141, the second metal element 142, the third metal element 143, the fourth metal element 144, and the fifth metal element 145 may be fixed by another nonconductive mechanism structure (not shown). Other features of the transmission device 300 of FIG. 3A and FIG. 3B are similar to those of the transmission device 200 of FIG. 2. Therefore, the two embodiments can achieve similar levels of performance.

Figure 4:
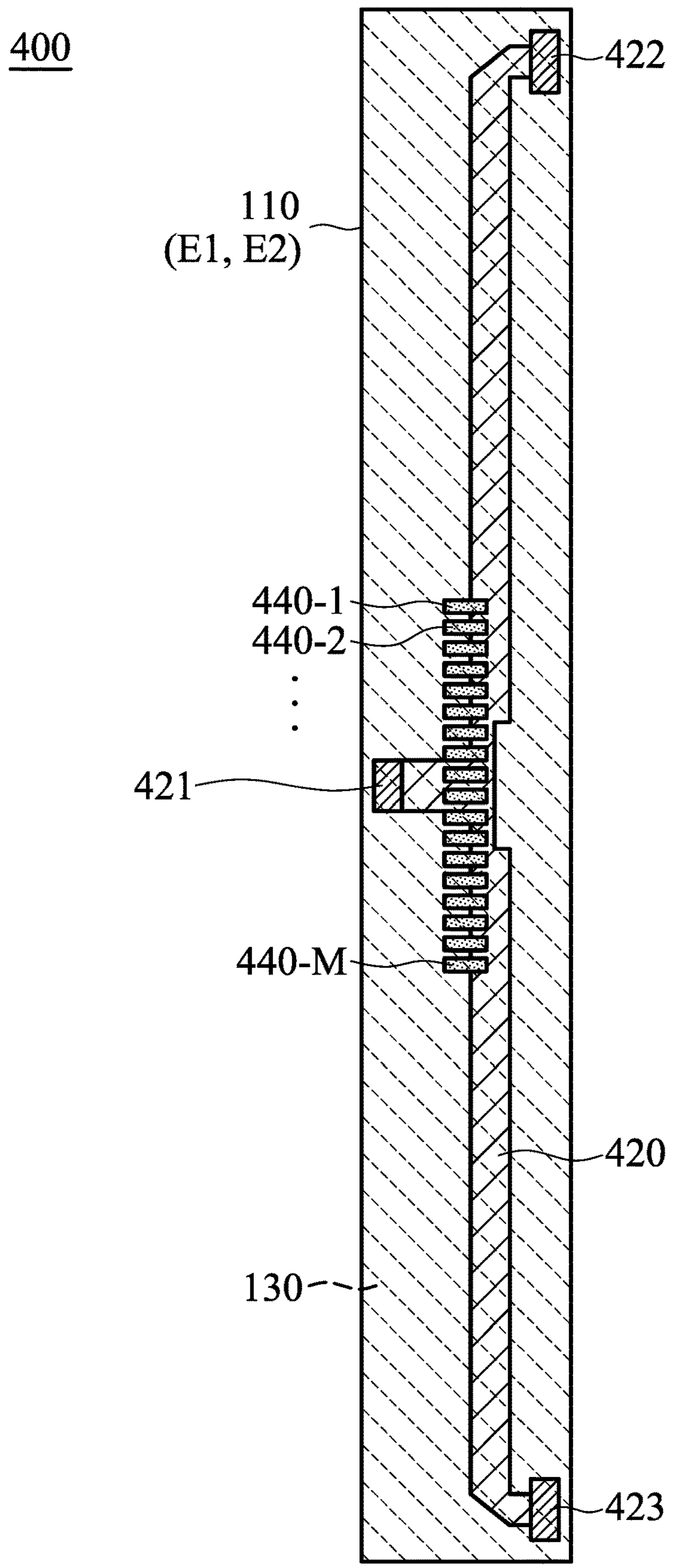
FIG. 4 is a top view of a transmission device according to an embodiment of the invention.

FIG. 4 is a top view of a transmission device 400 according to an embodiment of the invention. FIG. 4 is similar to FIG. 2. In the embodiment of FIG. 4, a signal line 420 of the transmission device 400 substantially has a T-shape. A power splitter is formed by the signal line 420 and the ground plane 130. Specifically, the signal line 420 has a first end 421, a second end 422, and a third end 423, which are considered as a common input terminal, a first output terminal, and a second output terminal of the power splitter. Also, the transmission device 400 further includes a plurality of metal elements 440-1, 440-2, . . . , and 440-M coupled to the signal line 420 ("M" is an integer greater than or equal to 2). For example, a half of the metal elements 440-1, 440-2, . . . , and 440-M may be positioned at the top side of the first end 421 of the signal line 420, and the other half of the metal elements 440-1, 440-2, . . . , and 440-M may be positioned at the bottom side of the first end 421 of the signal line 420. Thus, the output phase difference between the second end 422 and the third end 423 of the signal line 420 may be substantially equal to 0. Other features of the transmission device 400 of FIG. 4 are similar to those of the transmission device 200 of FIG. 2. Therefore, the two embodiments can achieve similar levels of performance.

Figure 5:
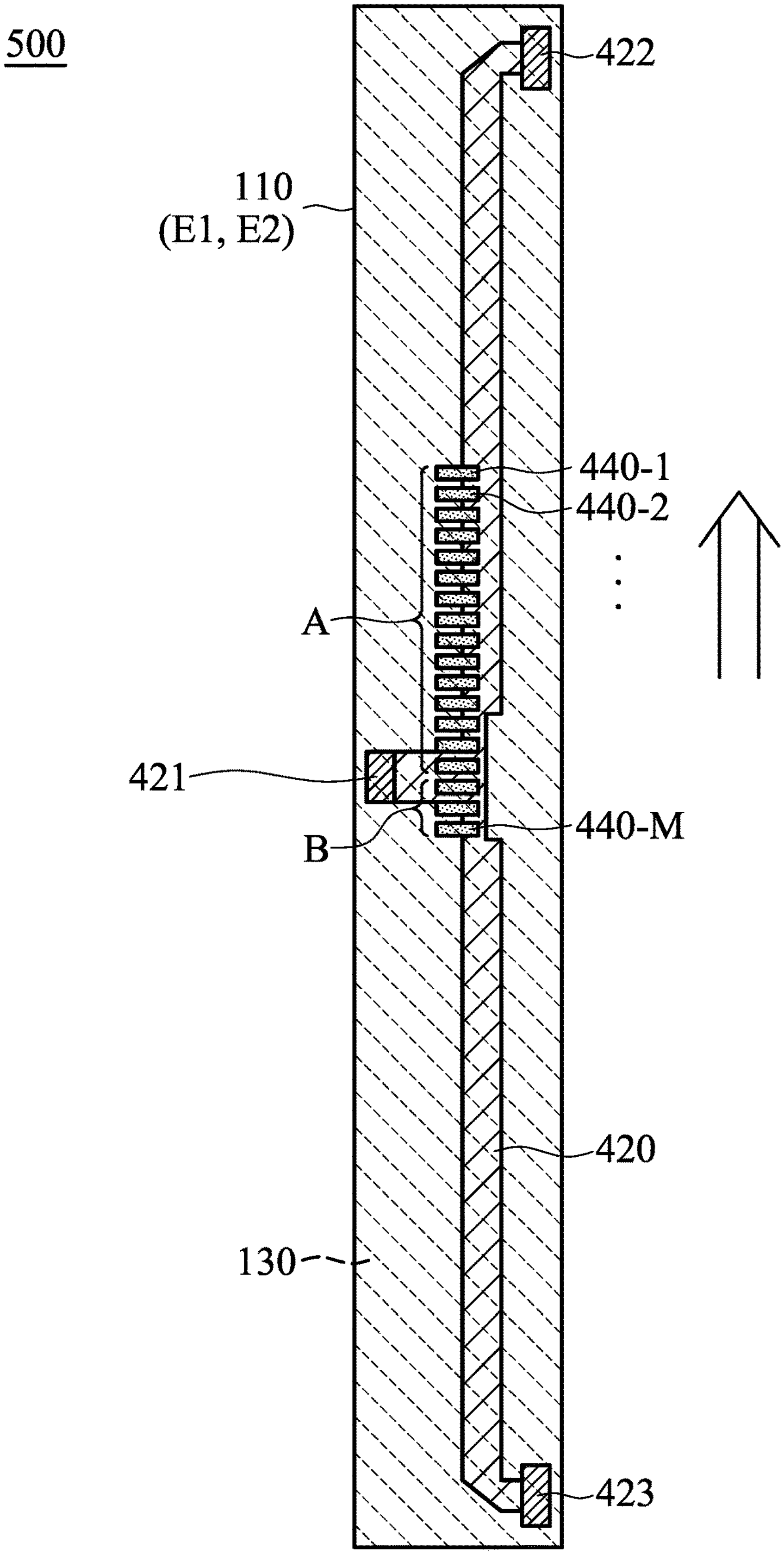
FIG. 5 is a top view of a transmission device according to an embodiment of the invention.

FIG. 5 is a top view of a transmission device 500 according to an embodiment of the invention. FIG. 5 is similar to FIG. 4. In the embodiment of FIG. 5, "A" metal elements among the metal elements 440-1, 440-2, . . . , and 440-M of the transmission device 500 are positioned at the top side of the first end 421 of the signal line 420, and "B" metal elements among the metal elements 440-1, 440-2, . . . , and 440-M of the transmission device 500 are positioned at the bottom side of the first end 421 of the signal line 420 (where "A" and/or "B" may be 0 or an integer). At this time, the output phase difference (or called as the total delay phase of the transmission device 500) between the second end 422 and the third end 423 of the signal line 420 can be described using the following equations (2), (3) and (4):

$$\theta = S \cdot Q \cdot K \cdot \sqrt{1.15^{W} \cdot 2^{L} \cdot W \cdot L} \tag{2}$$

$$M = A + B \tag{3}$$

$$S = |A - B| \tag{4}$$

where "θ" represents the total delay phase θ, "M" represents the total number of metal elements, "S" represents an effective differential number of metal elements at different sides, "Q" represents a style constant equal to 0.975, "K" represents an error constant between 0.7 and 1.2, "W" represents the protruding width, and "L" represents the protruding length.

In addition, the unit of each of "W" and "L" is millimeter (mm). For example, if the protruding width W is equal to 1 mm and the protruding length L is equal to 2 mm, "W" may be set to 1 and "L" may be set to 2, but they are not limited thereto. In response, the unit of the total delay phase θ is "degree". Other features of the transmission device 500 of FIG. 5 are similar to those of the transmission device 400 of FIG. 4. Therefore, the two embodiments can achieve similar levels of performance.

Figure 6:
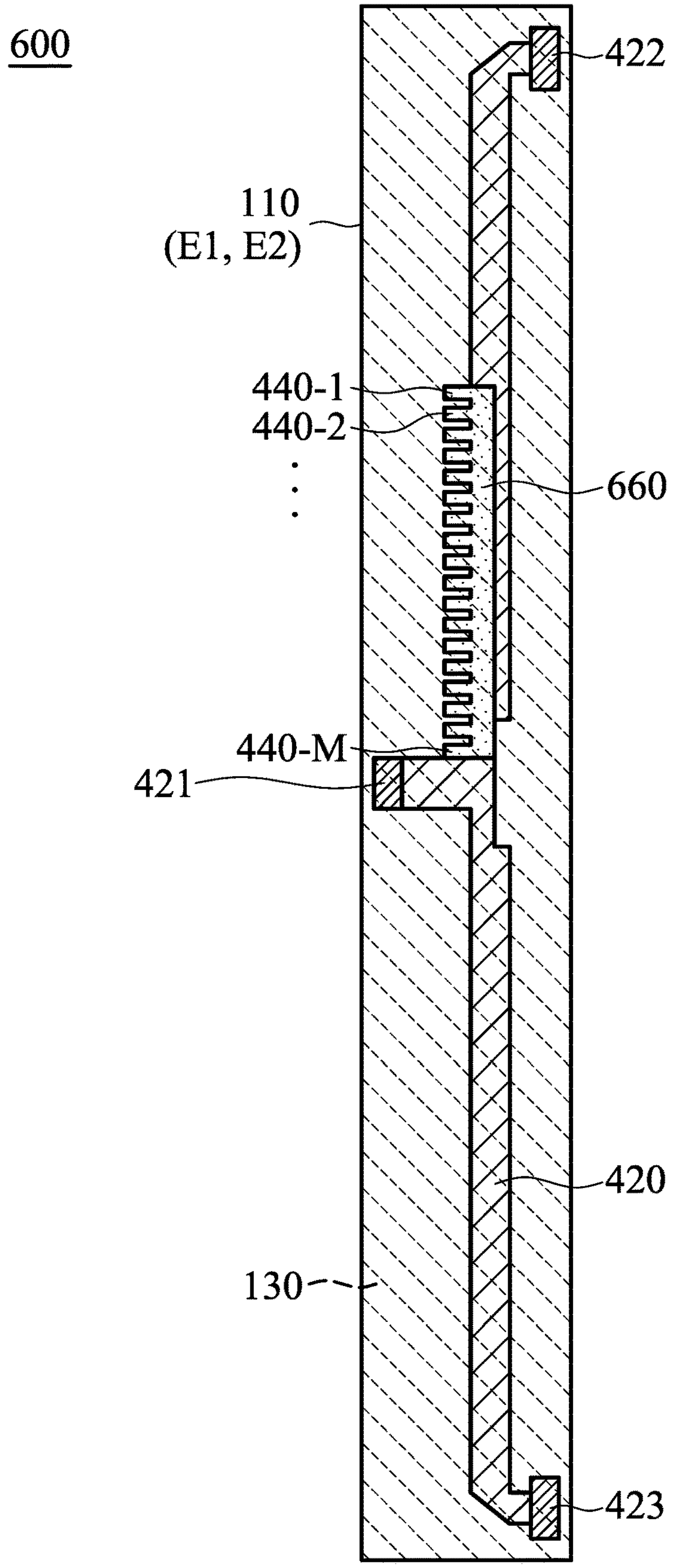
FIG. 6 is a top view of a transmission device according to an embodiment of the invention.

FIG. 6 is a top view of a transmission device 600 according to an embodiment of the invention. FIG. 6 is similar to FIG. 5. In the embodiment of FIG. 6, the transmission device 600 further includes a connection element 660, which is made of a metal material. The connection element 660 may substantially have a straight-line shape. The connection element 660 is configured to couple the metal elements 440-1, 440-2, . . . , and 440-M with each other. Other features of the transmission device 600 of FIG. 6 are similar to those of the transmission device 500 of FIG. 5. Therefore, the two embodiments can achieve similar levels of performance.

Figure 7:
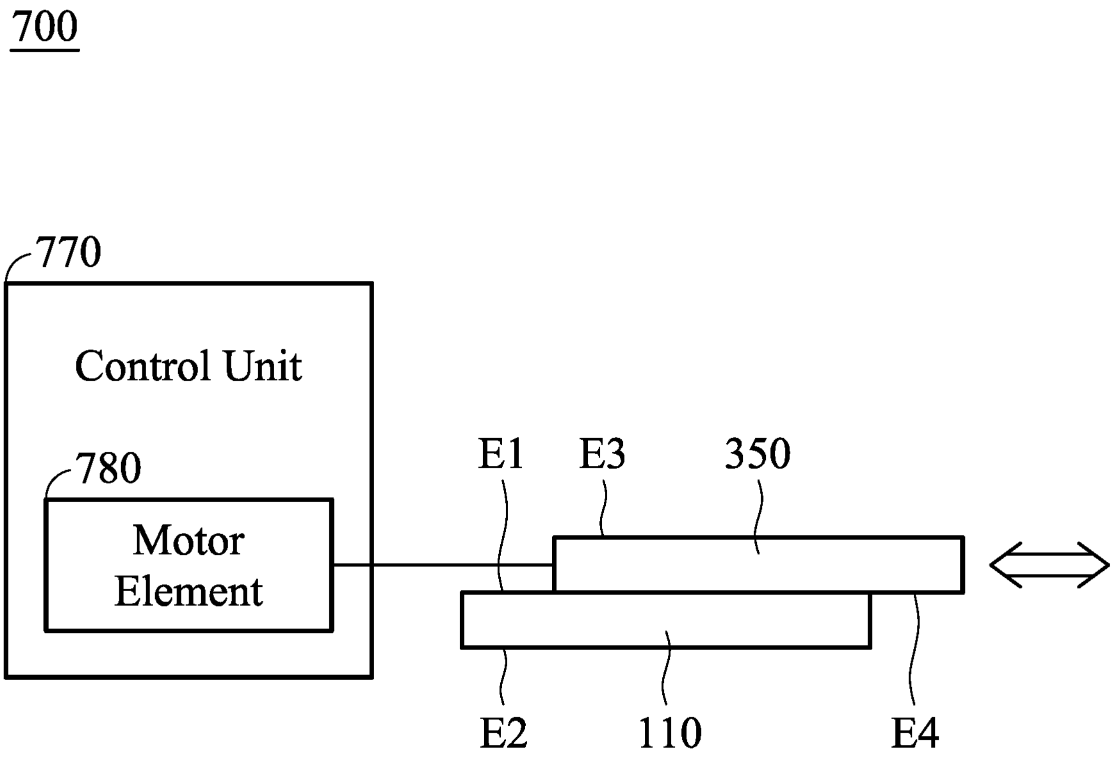
FIG. 7 is a side view of a transmission device according to an embodiment of the invention.

FIG. 7 is a side view of a transmission device 700 according to an embodiment of the invention. Please refer to FIG. 4, FIG. 5 and FIG. 7 together. In the embodiment of FIG. 7, besides the first dielectric layer 110 and the second dielectric layer 350 as mentioned above, the transmission device 700 further includes a control unit 770, which includes a motor element 780. The transmission device 700 may further include other components, such a roller, a track, and/or a fixing element, although they are not displayed in FIG. 7. The control unit 770 is configured to control and move the positions of the metal elements 440-1, 440-2, . . . , and 440-M. For example, the control unit 770 may be configured to control and move the second dielectric layer 350. Thus, the second dielectric layer 350 is movable with respect to the first dielectric layer 110. It should be noted that the metal elements 440-1, 440-2, . . . , and 440-M are all disposed on the fourth surface E4 of the second dielectric layer 350, and the signal line 420 is disposed on the first surface E1 of the first dielectric layer 110. With this design, the total delay phase of the transmission device 700 can be adjusted using the control unit 770. For example, the transmission device 700 may become the transmission device 400 of FIG. 4 (with a relatively small output phase difference) by changing the positions of the metal elements 440-1, 440-2, . . . , and 440-M. Alternatively, the transmission device 700 may become the transmission device 500 of FIG. 5 (with a relatively large output phase difference) by changing the positions of the metal elements 440-1, 440-2, . . . , and 440-M.

The invention proposes a novel transmission device. In comparison to the conventional design, the invention has the advantages of phase adjustment function, simple whole circuitry, and low manufacturing. Therefore, the invention is suitable for application in a variety of electronic devices.

Note that the above element sizes, element shapes, and element parameters are not limitations of the invention. A designer can fine-tune these settings or values according to different requirements. It should be understood that the transmission device of the invention is not limited to the configurations of FIGS. 1-7. The invention may merely include any one or more features of any one or more embodiments of FIGS. 1-7. In other words, not all of the features displayed in the figures should be implemented in the transmission device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transmission device with a function of phase adjustment, comprising:

a first dielectric layer, having a first surface and a second surface opposite to each other;

a signal line, disposed on the first surface of the first dielectric layer;

a ground plane, disposed on the second surface of the first dielectric layer;

a first metal element, coupled to a first connection point on the signal line, wherein the first metal element provides a first delay phase; and a second metal element, disposed adjacent to the first metal element, and coupled to a second connection point on the signal line, wherein the second metal element provides a second delay phase;

wherein the first metal element has a protruding length and a protruding width with respect to the signal line;

wherein a microstrip line is formed by the signal line and the ground plane;

wherein a total delay phase of the transmission device is described using the following equation:

$$\theta = N \cdot P \cdot K \cdot \sqrt{1.15^{W} \cdot 2^{L} \cdot W \cdot L}$$

where "θ" represents the total delay phase, "N" represents a total number of metal elements, "P" represents a style constant equal to 1.18, "K" represents an error constant between 0.7 and 1.2, "W" represents the protruding width, and "L" represents the protruding length.

2. The transmission device as claimed in claim 1, wherein the first metal element substantially has a rectangular shape, a triangular shape, an elliptical shape, or a wavy shape.

3. The transmission device as claimed in claim 1, wherein the signal line substantially has a T-shape.

4. The transmission device as claimed in claim 1, wherein each of the protruding length and the protruding width is from 1 mm to 3 mm.

5. The transmission device as claimed in claim 1, further comprising:

a connection element, coupling the first metal element with the second metal element.

6. The transmission device as claimed in claim 1, wherein a coupling gap is formed between the first metal element and the second metal element, and a width of the coupling gap is substantially equal to the protruding width.

7. The transmission device as claimed in claim 1, wherein the signal line substantially has a straight-line shape.

8. The transmission device as claimed in claim 1, further comprising:

a third metal element, disposed adjacent to the second metal element, and coupled to a third connection point on the signal line, wherein the third metal element provides a third delay phase.

9. The transmission device as claimed in claim 8, further comprising:

a fourth metal element, disposed adjacent to the third metal element, and coupled to a fourth connection point on the signal line, wherein the fourth metal element provides a fourth delay phase.

10. The transmission device as claimed in claim 9, further comprising:

a fifth metal element, disposed adjacent to the fourth metal element, and coupled to a fifth connection point on the signal line, wherein the fifth metal element provides a fifth delay phase.

11. The transmission device as claimed in claim 1, further comprising:

a second dielectric layer, having a third surface and a fourth surface opposite to each other, wherein the first metal element and the second metal element are disposed on the fourth surface of the second dielectric layer.

12. The transmission device as claimed in claim 11, wherein the fourth surface of the second dielectric layer is attached to the first surface of the first dielectric layer.

13. The transmission device as claimed in claim 11, further comprising:

a control unit, comprising a motor element, wherein the control unit is configured to control and move the second dielectric layer.

14. The transmission device as claimed in claim 13, wherein a total delay phase of the transmission device is adjusted by using the control unit.

15. A transmission device with a function of phase adjustment, comprising:

a first dielectric layer, having a first surface and a second surface opposite to each other;

a signal line, disposed on the first surface of the first dielectric layer;

a ground plane, disposed on the second surface of the first dielectric layer;

a first metal element, coupled to a first connection point on the signal line, wherein the first metal element provides a first delay phase; and a second metal element, disposed adjacent to the first metal element, and coupled to a second connection point on the signal line, wherein the second metal element provides a second delay phase;

wherein the first metal element has a protruding length and a protruding width with respect to the signal line;

wherein a power splitter is formed by the signal line and the ground plane;

wherein a total delay phase of the transmission device is described using the following equation:

$$\theta = S \cdot Q \cdot K \cdot \sqrt{1.15^{W} \cdot 2^{L} \cdot W \cdot L}$$

where "θ" represents the total delay phase, "S" represents an effective differential number of metal elements at different sides, "Q" represents a style constant equal to 0.975, "K" represents an error constant between 0.7 and 1.2, "W" represents the protruding width, and "L" represents the protruding length.

* * * * *